US011282384B2

United States Patent
McClay

(10) Patent No.: US 11,282,384 B2
(45) Date of Patent: Mar. 22, 2022

(54) TRAFFIC LIGHT CAMERA AND SPEED CAMERA NOTIFICATION SYSTEM AND METHOD

(71) Applicant: Brennan James McClay, Vancouver (CA)

(72) Inventor: Brennan James McClay, Vancouver (CA)

( * ) Notice: Subject to any disclaimer, the term of this patent is extended or adjusted under 35 U.S.C. 154(b) by 0 days.

(21) Appl. No.: 16/699,180

(22) Filed: Nov. 29, 2019

(65) Prior Publication Data
US 2021/0166559 A1  Jun. 3, 2021

(51) Int. Cl.
| G08G 1/0967 | (2006.01) |
| G08G 1/0968 | (2006.01) |
| G08G 1/095 | (2006.01) |
| G01C 21/34 | (2006.01) |
| G01C 21/36 | (2006.01) |

(52) U.S. Cl.
CPC ... *G08G 1/096716* (2013.01); *G01C 21/3492* (2013.01); *G01C 21/3697* (2013.01); *G08G 1/095* (2013.01); *G08G 1/096741* (2013.01); *G08G 1/096775* (2013.01); *G08G 1/096844* (2013.01)

(58) Field of Classification Search
CPC ............. G01C 21/3697; G08G 1/0967; G08G 1/096775
See application file for complete search history.

(56) References Cited

U.S. PATENT DOCUMENTS

| 7,466,227 B2 | 12/2008 | Chen et al. |
| 8,599,040 B2 | 12/2013 | Malaska |
| 8,995,723 B2 | 3/2015 | Stein et al. |
| 9,035,797 B2 | 5/2015 | Varma |
| 10,083,607 B2 | 9/2018 | Ginsberg et al. |
| 10,152,886 B2 | 12/2018 | Weber |
| 2005/0156757 A1 | 7/2005 | Garner |
| 2012/0268306 A1* | 10/2012 | Coburn ................... G01S 7/022 342/20 |
| 2013/0187792 A1 | 7/2013 | Egly |
| 2016/0006922 A1* | 1/2016 | Boudreau ............... G01S 7/022 348/207.1 |
| 2018/0174446 A1* | 6/2018 | Wang ..................... G08G 1/017 |
| 2019/0056230 A1 | 2/2019 | Hatav |

* cited by examiner

*Primary Examiner* — Hongmin Fan
(74) *Attorney, Agent, or Firm* — Argus Intellectual Enterprise; Daniel Enea; Jordan Sworen

(57) ABSTRACT

A traffic light and speed camera notification system and method. The traffic light and speed camera notification system includes a user device with a GPS unit that is able to locate a position of the user device. A server is in communication with the user device and able to transmit to the user device traffic light camera location information and speed camera location information. When the user device crosses a threshold distance of a speed or traffic camera, an alert is generated on the user device. The alert is an audible sound from the user device and/or displays a notification text message box. Further, the traffic light and speed camera notification system does not require a destination location to be input or a route to be programed for the alert to be generated.

13 Claims, 3 Drawing Sheets

TRAFFIC LIGHT CAMERA AND SPEED CAMERA NOTIFICATION SYSTEM AND METHOD

BACKGROUND OF THE INVENTION

The present invention relates to traffic light and speed camera notification systems and methods. More specifically, the present invention relates to a traffic light and speed camera notification system adapted to detect the location of a user device and generate an alert when the traffic light camera location information or the speed camera location is within a predefined distance of the user device.

Local and state governments have been utilizing camera and other technologies in an effort to deter and penalize dangerous driving behaviors, such as speeding and driving through an intersection during a red signal phase of the traffic light. In many jurisdictions, the implementation of traffic light cameras and speed cameras at certain road sections and intersections are used for detection of speed and red-light violations. These cameras capture an image of the vehicle during the violation and transmits the image to a system for issuing fines or other penalties.

In the case of red-light violations, the camera may be used in conjunction with vehicle detection systems that are usually in-ground sensors which detect the presence of a vehicle at a particular point on the roadway. The camera system is also connected to the traffic signal controller, generally the red feed for the purpose of coordinating to the red signal phase. In principle, an image of an offending vehicle is captured when a vehicle is detected about to enter the intersection, and/or in the intersection during the red signal phase.

With speed violations, similar cameras are used with a speed measuring device, such as mobile radar. For speed enforcement, an image of the vehicle is captured when the speed measuring system detects a vehicle traveling at a speed in excess of a preset threshold speed.

There currently exists systems and devices for warning a driver of excessive speed or irresponsible driving conditions. However, these known systems and devices fail to provide an alert directly to a user's device, such as the driver, in a manner that does not require predictive behavior systems or navigation routes to be inputted prior to encountering the cameras. At times, these known systems and devices utilize a route and the current phase of the traffic light to determine if a warning needs to be sent to the driver. However, in real world situations, the setup and activation of these systems have limited usefulness. The requirement of providing final destinations for a predicted route to be generated and having a software application being active throughout the trip is a barrier to usage. Moreover, these systems fail to account for detour and unscheduled stops along the way. The notifications or alerts are based on information provided or predicted route generation. These implementations of systems based on these techniques have complicated these systems and fail to account for unscheduled stops or detours.

Moreover, these existing devices fail to provide a traffic light and speed camera notification system having a user device with a GPS unit adapted to detect user location information, a server having traffic light camera location information and speed camera location information stored on non-transitory computer readable medium, wherein the user device is configured to generate an alert when the traffic light camera location information or the speed camera location is within a predefined distance of the user device.

In light of the devices disclosed in the known art, it is submitted that the present invention substantially diverges in design elements and methods from the known art and consequently it is clear that there is a need in the art for an improvement for a traffic light and speed camera notification system and method. In this regard the instant invention substantially fulfills these needs.

SUMMARY OF THE INVENTION

In view of the foregoing disadvantages inherent in the known types of traffic light and speed camera notification systems and methods now present in the known art, the present invention provides a user device adapted to detect the location of a user device and generate an alert when the traffic light location information or the speed camera location is within a predefined distance of the user device.

It is one objective of the present invention to provide a traffic light and speed camera notification system comprising a user device with a GPS unit adapted to detect user location information, a server having traffic light camera location information and speed camera location information stored on non-transitory computer readable medium, wherein the user device is configured to generate an alert when the traffic light camera location information or the speed camera location is within a predefined distance of the user device.

It is another objective of the present invention to provide a traffic light and speed camera notification system that generates the alert as an audible sound and/or displays a notification text message box.

It is another objective of the present invention to provide a traffic light and speed camera notification system that provides the alert without requiring a destination location to be previously received by the system.

It is another objective of the present invention to provide a traffic light and speed camera notification system that updates the traffic light camera location information and the speed camera location information from a master device.

It is yet another objective of the present invention to provide a traffic light and speed camera notification system and method wherein the user device stores citywide traffic light camera location information and speed camera location on local memory of the user device such that if communication with server is interrupted the traffic light camera location information and speed camera location is still available to the system.

It is therefore an object of the present invention to provide a new and improved traffic light and speed camera notification system and method that has all of the advantages of the known art and none of the disadvantages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings.

Reference will now be made in detail to the exemplary embodiment (s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment" does not necessarily refer to the same embodiment.

As used herein, "computer-readable medium" or "memory" excludes any transitory signals, but includes any non-transitory data storage circuitry, e.g., buffers, cache, and queues, within transceivers of transitory signals. As used herein, "logic" refers to (i) logic implemented as computer instructions and/or data within one or more computer processes and/or (ii) logic implemented in electronic circuitry.

DETAILED DESCRIPTION OF THE INVENTION

Reference is made herein to the attached drawings. For the purposes of presenting a brief and clear description of the present invention, the preferred embodiment will be discussed as used for providing an alert to a driver having a smartphone when the smartphone approaches an intersection having a traffic light camera. The figures are intended for representative purposes only and should not be considered to be limiting in any respect.

Figure 1:
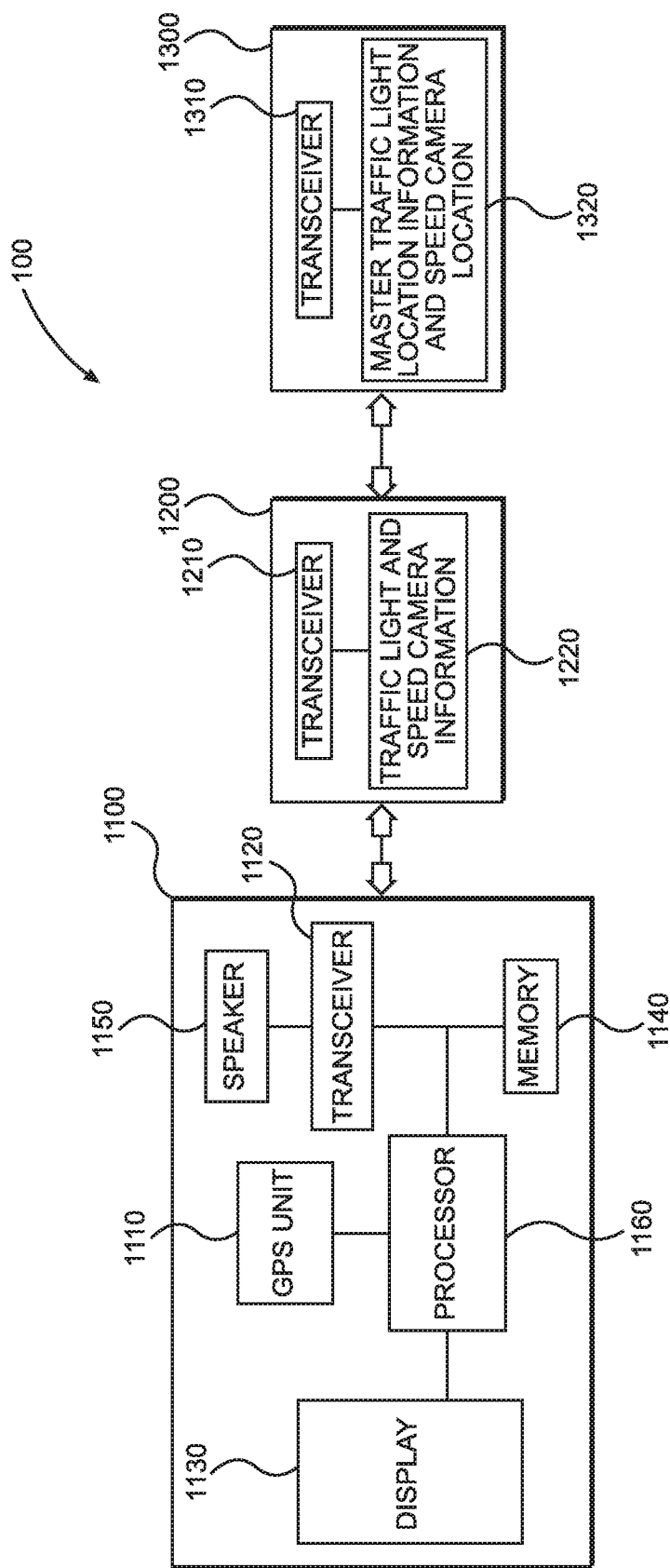
FIG. 1 shows a block diagram view of an embodiment of the traffic light and speed camera notification system.

Referring now to FIG. 1, there is shown a block diagram view of an embodiment of the traffic light and speed camera notification system. The traffic light and speed camera notification system 1000 provides a method of alerting a user of a traffic light camera and/or a speed camera in close proximity of the user. The traffic light and speed camera notification system 1000 comprises a user device 1100 having a GPS unit 1110 adapted to detect user location information. The GPS unit 1110 is adapted to receive satellite signals and process the signal in a processor 1160 and store the user location information on non-transitory memory 1140. In one embodiment, the user device 1100 is a smartphone. In alternative embodiments, the user device 1100 is any electronic device, such as a tablet, laptop, or vehicle computer system. In one embodiment, the user device 1100 further provides a display 1130 and speaker 1150.

In the shown embodiment, the user device 1100 is in wireless communication with a server 1200 having traffic light camera location information and speed camera location information 1220 stored on non-transitory computer readable medium. The user device 1100 and server 1200 utilize wireless transceivers 1120, 1210 respectively. These transceivers 1120, 1210 are adapted for wireless communication through wireless technologies, such as Wi-Fi and Bluetooth protocol standards. In other embodiments, the transceivers 1120, 1210 are adapted for cellular communication.

In one embodiment, the user device 1100 is configured to generate an alert when the traffic light camera location information or the speed camera location information 1220 is within a predefined distance of the user device 1100. The traffic light camera location information or the speed camera location information 1220 may include information such as a camera identification number, latitude, longitude, and altitude associated for each camera identification number. Further, the traffic light camera location or the speed camera location 1220 information may include camera status (such as "active", "inactive"), camera type, and the like.

As new cameras are added to the roadways, a new camera identification number may be issued to that new camera. Moreover, as camera are removed from the roadways, the camera status may be marked as inactive or be removed from the database storing the traffic light camera location information or the speed camera location 1220.

In one embodiment, local traffic light camera location information or the speed camera location is locally stored on a memory of the user device 1110. The local traffic light camera location information or the speed camera location 1220 contains map data, traffic regulation data, and position data related to the location of traffic light cameras and speed cameras within a predetermined geographical area are stored. In this way, should the wireless communication between the user device 1100 and the server 1200 occur, the user device 1100 has the traffic light camera location information or the speed camera location 1220 from the local memory 1140. In one embodiment, the traffic light camera location information or the speed camera location 1220 stored on the local memory 1140 is limited to cameras within a predefined area of the user device 1100. For example, the local memory 1140 has stored thereon the traffic light camera location information or the speed camera location 1220 of all cameras within a ten-mile radius of the user device 1100 at the storing time.

In one embodiment, a master device 1300 is operably connected to the server 1200. The master device 1300 includes memory and a transceiver adapted for wireless communication with the server 1200. The master device 1300 includes master traffic light camera location information and speed camera location information 1320. The master traffic light camera location information and speed camera location information 1320 is used to update the traffic light camera location information and speed camera location information of the server 1200.

Figure 2:
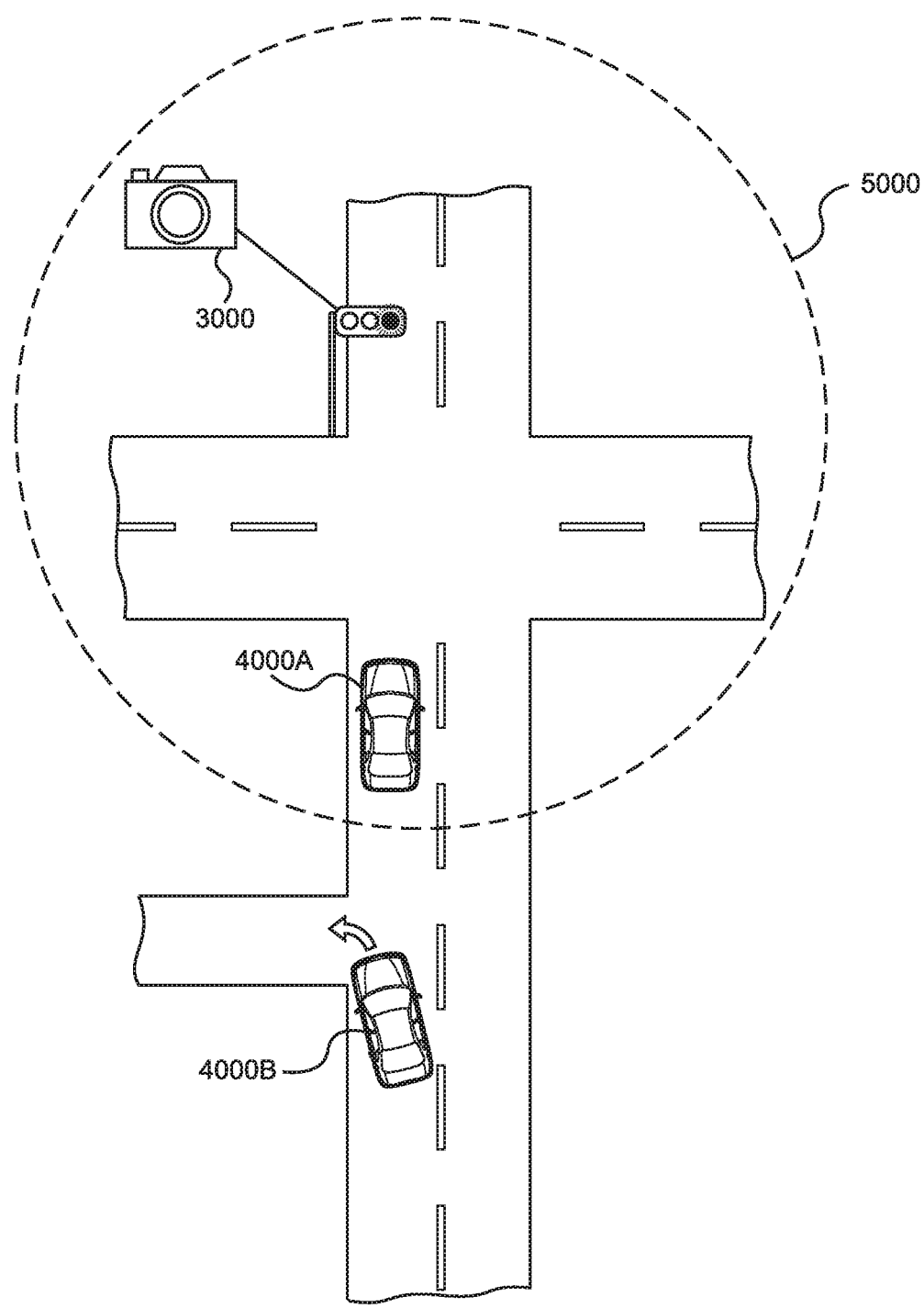
FIG. 2 shows an overhead depiction of an embodiment of the traffic light and speed camera notification system as a user device approaches a traffic light camera.

Referring now to FIG. 2, there is shown an overhead depiction of an embodiment of the traffic light and speed camera notification system as a user device 1100 approaches a traffic light camera 3000. In the shown view, a first vehicle 4000A and a second vehicle 4000B, each having a user device 1100 therein, approaches an intersection with a traffic light camera 3000. As the vehicles 4000A, 4000B drive towards the traffic light camera 3000, the user devices 1100 updates in real-time the user location information via the GPS unit. In alternative embodiments, the user location information is updated at predefined intervals to save user device power.

Figure 3:
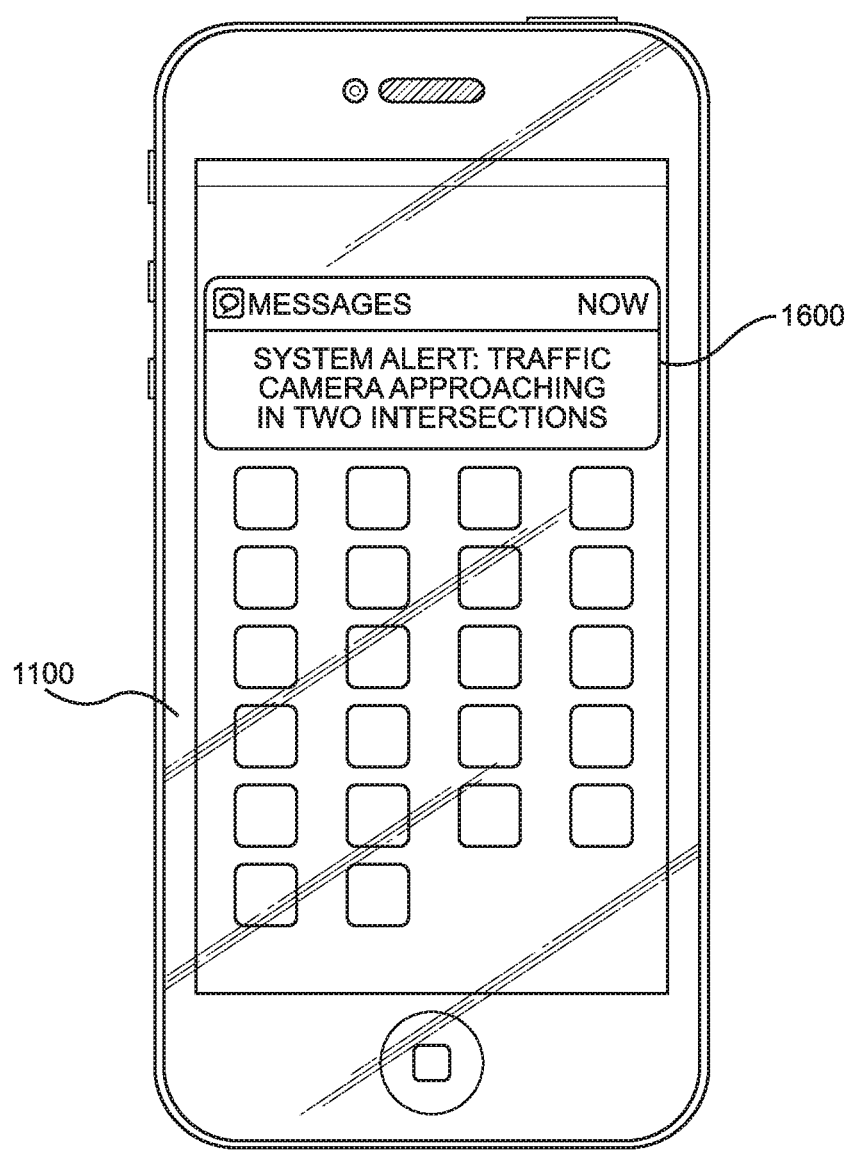
FIG. 3 shows a front view of an embodiment of a graphical user interface of the user device with an alert generated when the user device of FIG. 2 comes within the predefined distance of the traffic light camera.

As the user device of the first vehicle 4000A approaches the intersection, the first vehicle 4000A crosses a predetermined distance 5000 from the traffic light camera 5000 that triggers the alert to notify the user of the approaching traffic light camera 3000. As shown in the embodiment of FIG. 3, the alert is shown as a text notification. In alternative embodiments, the alert may be audible and may accompany the text notification.

As the user device of the second vehicle 4000B approaches the intersection, the second vehicle 4000B does not cross the predetermined distance 5000 from the traffic light camera 5000. Since the second vehicle 4000B does not cross the threshold predetermined distance 5000 by turning prior to approaching the intersection. In this way, the driver of the second vehicle 4000B is not sent the alert.

In some embodiments, the intersection will also comprise an in-ground sensor configured to detect the presence of the first or second vehicle during a red-light violation. In this embodiment, the predetermined distance is defined in direct relation to the location and distance from the in-ground sensor. In some embodiments, the predetermined location is 200 to 1,000 feet away from the in-ground sensor. In this way, the vehicle has enough time to slow down and stop prior to passing over the in-ground sensor.

In one embodiment, the alert is communicated without requiring a destination location to be entered into the user device to generate the alert. Moreover, the present invention does not require a navigation route to trigger the alert to be generated on the user device.

Referring now to FIG. 3, there is shown a front view of an embodiment of a graphical user interface of the user device with an alert generated when the user device of FIG. 2 comes within the predefined distance of the traffic light camera. In the shown embodiment, the user device 1100 is a smartphone and the alert is a text message 1600. The present invention does not require a navigation application to be running in the background to generate and display the text message 1600. The text message 1600 is similar to other notification of the smartphone. In alternative embodiments, the text message 1600 is accompanies with an audible message. In other embodiments, the audible message is the only alert without the text message 1600.

In one embodiment, the present invention provides a user device having logic, that when executed by a processor causes the traffic light and speed camera notification method to display an alert on the user device, method comprising: gathering a user location information of the user device via a GPS unit; receiving traffic light camera location information or speed camera location information from a server; verifying the traffic light camera location information or the speed camera location information is within a predefined distance of the user device; displaying the alert on the user device.

In one embodiment, the alert is a warning message. In an alternative embodiment, the alter is a text message.

In one embodiment, the method further comprises transmitting local traffic light camera location information and speed camera location to the user device for storage on local memory.

In one embodiment, the method further comprises updating the traffic light camera location information and speed camera location information on the server from a master device that is operably connected to the server, wherein the master device includes a master traffic light camera location information and speed camera location information.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A traffic light and speed camera notification system, comprising:
    a user device having a GPS unit adapted to detect user location information;
    a server having traffic light camera location information and speed camera location information stored on non-transitory computer readable medium;
    wherein the user device is configured to generate an alert when the traffic light camera location information or the speed camera location is within a predefined distance of the user device;
    wherein the traffic light and speed camera notification system is configured to generate the alert without any input of a destination location, so as to facilitate alerts with minimal interaction with the user device.

2. The traffic light and speed camera notification system of claim 1, wherein the alert is an audible sound.

3. The traffic light and speed camera notification system of claim 1, wherein the alert is a text message.

4. The traffic light and speed camera notification system of claim 1, wherein the traffic light camera location information and speed camera location information are updated only from a master device.

5. The traffic light and speed camera notification system of claim 1, wherein local traffic light camera location information and speed camera location is stored on local memory of the user device.

6. The traffic light and speed camera notification system of claim 1, wherein a master device is operably connected to the server, wherein the master device includes a master traffic light camera location information and speed camera location information that is used to update the server.

7. A traffic light and speed camera notification method, comprising:
    providing a user device having logic, that when executed by a processor causes the traffic light and speed camera notification method to display an alert on the user device, comprising:
    gathering a user location information of the user device via a GPS unit;
    receiving traffic light camera location information or speed camera location information from a server;
    verifying the traffic light camera location information or the speed camera location information is within a predefined distance of the user device;
    displaying the alert on the user device;
    wherein the traffic light and speed camera notification system is configured to generate the alert without any input of a destination location, so as to facilitate alerts with minimal interaction with the user device.

8. The traffic light and speed camera notification method of claim 7, wherein the alert is a warning message.

9. The traffic light and speed camera notification method of claim 7, wherein the user device does not generate a navigation route.

10. The traffic light and speed camera notification method of claim 7, further comprising:
    transmitting local traffic light camera location information and speed camera location to the user device for storage on local memory.

11. The traffic light and speed camera notification method of claim 7, further comprising:

updating the traffic light camera location information and speed camera location information on the server from a master device that is operably connected to the server, wherein the master device includes a master traffic light camera location information and speed camera location information.

12. The traffic light and speed camera notification method of claim 1, wherein the traffic light camera location information and speed camera location information is adapted to designated as an in-ground sensor type;
   wherein the predefined distance is defined in direct relation to the location and distance from the in-ground sensor which is offset from the location of the camera.

13. A traffic light and speed camera notification system, comprising:
   a user device having a GPS unit adapted to detect user location information;
   a server having traffic light camera location information and speed camera location information stored on non-transitory computer readable medium;
   wherein the user device is configured to generate an alert when the traffic light camera location information or the speed camera location is within a predefined distance of the user device;
   wherein the traffic light and speed camera notification system is configured to generate the alert without any input or generation of a navigation route, so as to facilitate alerts with minimal interaction with the user device.

* * * * *